(12) United States Patent
Salasoo et al.

(10) Patent No.: US 11,580,430 B2
(45) Date of Patent: Feb. 14, 2023

(54) SYSTEM AND METHODS FOR DETERMINING A QUALITY SCORE FOR A PART MANUFACTURED BY AN ADDITIVE MANUFACTURING MACHINE

(71) Applicant: General Electric Company, Schenectady, NY (US)

(72) Inventors: Lembit Salasoo, Niskayuna, NY (US); Vipul K. Gupta, Guilderland, NY (US); Xiaohu Ping, Niskayuna, NY (US); Subhrajit Roychowdhury, Schenectady, NY (US); Justin Gambone, Jr., Niskayuna, NY (US); Naresh Iyer, Schenectady, NY (US); Xiaolei Shi, Schnectady, NY (US); Mengli Wang, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 909 days.

(21) Appl. No.: 16/257,367

(22) Filed: Jan. 25, 2019

(65) Prior Publication Data
US 2020/0242496 A1 Jul. 30, 2020

(51) Int. Cl.
*G06N 7/00* (2006.01)
*G06N 20/00* (2019.01)
(Continued)

(52) U.S. Cl.
CPC .............. *G06N 7/00* (2013.01); *B22F 10/20* (2021.01); *G06F 30/00* (2020.01); *G06N 20/00* (2019.01);
(Continued)

(58) Field of Classification Search
CPC .......... G06N 7/00; G06N 20/00; G06F 30/00; B22F 10/20
(Continued)

(56) References Cited

U.S. PATENT DOCUMENTS 9,855,698 B2 * 1/2018 Perez .................... B29C 64/106
9,977,425 B1 * 5/2018 McCann ............ G05B 19/4099
(Continued)

FOREIGN PATENT DOCUMENTS

EP 3258219 A1 12/2017
WO 2017087451 A1 5/2017

OTHER PUBLICATIONS

Clijsters et al. (In situ quality control of the selective laser melting process using a high-speed, real-time melt pool monitoring system, 2014, Int J Adv Manuf Technol., pp. 1089-1101) (Year: 2014).*
(Continued)

*Primary Examiner* — Iftekhar A Khan
(74) *Attorney, Agent, or Firm* — Dority & Manning, P.A.

(57) ABSTRACT

Determining a quality score for a part manufactured by an additive manufacturing machine based on build parameters and sensor data without the need for extensive physical testing of the part. Sensor data is received from the additive manufacturing machine during manufacture of the part using a first set of build parameters. The first set of build parameters is received. A first algorithm is applied to the first set of build parameters and the received sensor data to generate a quality score. The first algorithm is trained by receiving a reference derived from physical measurements performed on at least one reference part built using a reference set of build parameters. The quality score is output via the communication interface of the device.

20 Claims, 6 Drawing Sheets

(51) Int. Cl.
*G06F 30/00* (2020.01)
*B22F 10/20* (2021.01)
*B33Y 10/00* (2015.01)
*B33Y 50/02* (2015.01)
*G06F 119/18* (2020.01)
*B22F 10/30* (2021.01)

(52) U.S. Cl.
CPC .............. *B22F 10/30* (2021.01); *B33Y 10/00* (2014.12); *B33Y 50/02* (2014.12); *G06F 2119/18* (2020.01)

(58) Field of Classification Search
USPC .......................................................... 703/2
See application file for complete search history.

(56) References Cited

U.S. PATENT DOCUMENTS

| | | | | |
|---|---|---|---|---|
| 10,252,509 | B2* | 4/2019 | Burlatsky | B33Y 30/00 |
| 10,254,754 | B2* | 4/2019 | McCann | B22F 10/38 |
| 2010/0174392 | A1* | 7/2010 | Fink | B29C 64/153 |
| | | | | 700/212 |
| 2015/0024233 | A1* | 1/2015 | Gunther | B22F 12/00 |
| | | | | 264/401 |
| 2015/0165683 | A1* | 6/2015 | Cheverton | B29C 64/124 |
| | | | | 382/141 |
| 2015/0177158 | A1* | 6/2015 | Cheverton | B22F 10/37 |
| | | | | 700/119 |
| 2016/0184893 | A1* | 6/2016 | Dave | B22F 12/90 |
| | | | | 419/53 |
| 2016/0185048 | A1* | 6/2016 | Dave | B22F 10/368 |
| | | | | 700/119 |
| 2016/0236414 | A1* | 8/2016 | Reese | B33Y 50/02 |
| 2016/0250810 | A1* | 9/2016 | Lynch August | G05B 19/4099 |
| | | | | 700/98 |
| 2018/0001565 | A1* | 1/2018 | Hocker | G01N 23/223 |
| 2018/0178287 | A1* | 6/2018 | Mamrak | B22F 10/85 |
| 2019/0004079 | A1* | 1/2019 | Blom | B22F 10/20 |
| 2019/0018400 | A1* | 1/2019 | McCann | B33Y 10/00 |
| 2019/0283333 | A1* | 9/2019 | Hwang | G06N 3/08 |
| 2020/0242495 | A1* | 7/2020 | Roychowdhury | B22F 10/28 |
| 2020/0242496 | A1* | 7/2020 | Salasoo | G06N 20/00 |

OTHER PUBLICATIONS

Delgado et al. (Influence of process parameters on part quality and mechanical properties for DMLS and SLM with iron-based materials, Int J Adv Manuf Technol (2012) 60:601-610) (Year: 2012).*

Tapia, Gustavo et al., "A Review on Process Monitoring and Control in Metal-Based Additive Manufacturing", Journal of Manufacturing Science and Engineering, vol. 136, Issue: 6, Dec. 2014, 10pgs.

Clijsters, S. et al., "In situ quality control of the selective laser melting process using a high-speed, real-time melt pool monitoring system", The International Journal of Advanced Manufacturing Technology, vol. 75, Issue: 5-8, Nov. 2014, DOI: 10.1007/s00170-014-6214-8, (pp. 1089-1101, 13 total pages).

* cited by examiner

SYSTEM AND METHODS FOR DETERMINING A QUALITY SCORE FOR A PART MANUFACTURED BY AN ADDITIVE MANUFACTURING MACHINE

FIELD OF THE INVENTION

The disclosed embodiments are directed to determining a quality score for a part manufactured by an additive manufacturing machine based on build parameters and sensor data without extensive physical testing of the part.

BACKGROUND

The term "additive manufacturing" refers to processes used to synthesize three-dimensional objects in which successive layers of material are formed by an additive manufacturing machine (AMM) under computer control to create an object using digital model data from a 3D model. One example of powder-bed fusion based additive manufacturing is direct metal laser sintering (DMLS), which uses a laser fired into a bed of powdered metal, with the laser being aimed automatically at points in space defined by a 3D model, thereby melting the material together to create a solid structure. The term "direct metal laser melting" (DMLM) may more accurately reflect the nature of this process since it typically achieves a fully developed, homogenous melt pool and fully dense bulk upon solidification. The nature of the rapid, localized heating and cooling of the melted material enables near-forged material properties, after any necessary heat treatment is applied.

The DMLM process uses a 3D computer-aided design (CAD) model of the object to be manufactured, whereby a CAD model data file is created and sent to the fabrication facility. A technician may work with the 3D model to properly orient the geometry for part building and may add supporting structures to the design, as necessary. Once this "build file" has been completed, it is "sliced" into layers of the proper thickness for the particular DMLM fabrication machine and downloaded to the machine to allow the build to begin. The DMLM machine uses, e.g., a 400 W Yb-fiber optic laser. Inside the build chamber area, there is a powder dispensing platform and a build platform along with a recoater blade used to move new powder over the build platform. The metal powder is fused into a solid part by melting it locally using the focused laser beam. In this manner, parts are built up additively layer by layer—typically using layers 20 to 100 micrometers thick. This process allows for highly complex geometries to be created directly from the 3D CAD data, automatically and without any tooling. DMLM produces parts with high accuracy and detail resolution, good surface quality, and excellent mechanical properties.

Anomalies, such as subsurface porosity, cracks, lack-of-fusion, etc., can occur in DMLM processes due to various machine, programming, environment, and process parameters, and due to the chemistry of the material used. For example, deficiencies in machine calibration of mirror positions and laser focus can result in bulk-fill laser passes not intersecting edge-outline passes. Such deficiencies can result in unfused powder near the surface of the component, which may break through the surface to cause anomalies which cannot be healed by post-processing heat treatment steps including hot isostatic pressing (HIP). Laser and optics degradation, filtration, and other typical laser welding effects can also significantly impact process quality, particularly when operating for dozens or hundreds of hours per build.

In conventional additive manufacturing practice, a part build plan (PBP) is generated for a particular part design and executed by the additive manufacturing machine (AMM). Based on the PBP, the AMM controls multiple build parameters that are applied during the build, including the travel path of the material addition zone and parameters governing the application and processing of the material added to the part in the zone. In general, there is a complex relationship between these parameters and the quality of the built part.

The design of the PBP is an iterative process, which includes building a part based on a trial PBP, followed by assessment of the resulting trial part quality, and then modification of the trial PBP to adjust the expected part quality. This iteration of trial PBPs to meet overall manufacturing requirements, such as part quality and production rate, may require multiple iterations to attain the desired manufacturing requirements. Conventionally, assessment of the trial part quality is done by experimental testing of the part using either destructive or non-destructive techniques. In particular, DMLM parts may be sectioned, optical micrographs produced from the processed section, and the micrographs processed to quantify anomalies. The assessment of trial part quality is based on such tests. Such testing is laborious, expensive, and time-consuming, and significantly increases the time and cost of developing an acceptable PBP to release to final production.

SUMMARY

Disclosed embodiments provide for predicting part quality without a physical testing step in every trial build iteration. A part quality model is developed based on sensor measurements made during the part build and other information known at the time of the build. Part quality-based decisions, such as modifications to the PBP, or part accept/reject, are based on the quality model results. Analyzing data generated during the build, and known at the time of analysis, instead of performing post-build testing reduces cost and elapsed time for PBP development, as well as cost and time for production part quality assessment.

The disclosed methods may be substituted fully or partly for physical testing or may be substituted for some parts of the overall testing process (e.g., for long build times and expensive parts). The methods may be applied for selected iterations, with physical testing being utilized in a selection of iterations. The methods may be used to screen built parts and to reduce the quantity of parts undergoing physical testing. The quality of a built part may be estimated using the model and expressed as one or more quality scores. Subsequent processing, scrapping or sorting of the built part may be based, wholly or in part, on the estimated quality score.

By virtue of these features, the quality of the part may be obtained quickly, and cheaply, in-situ or after a part is built. Consequently, the development of the final design of an additively-manufactured part may be done faster. Also, reliance on destructive part analysis methods, e.g., metallography, microscopy, physical and mechanical testing, may be significantly reduced or eliminated. Reliance on expensive, albeit non-destructive, part analysis methods, such as computed tomography (CT) imaging, may also be much reduced or eliminated.

Disclosed embodiments provide a method to correct for predictable disturbances in a DMLM process using a combination of model and sensor data. Based on the time-scale of disturbance prediction, this technology can be used to improve part quality from build to build (e.g., for geometric disturbances) or even layer-to-layer (e.g., for smoke occlusions). The goal is to reduce cycle time for part parameter optimization, which is conventionally done by trial and error method and therefore may take weeks to converge to an acceptable parameter set. Also, the conventional approach is more art than science as the final outcome depends on the expertise of the person.

In disclosed embodiments, an initial guess for the scan parameters is estimated based on a model which can be executed quickly. The result of an iteration is recorded in the sensors and compared to a previously-generated reference, e.g., the result of a previous iteration or the output of a model. The estimation error is then fed back to improve the model via a tracking filter and the updated model is used to generate a new set of scan parameters. The scan parameters can then be further tuned using the tracking error as desired. Because of an algorithmic approach, the process is expected to converge to the optimal parameter set after just a few iterations within a single build. Furthermore, in conventional approaches, the iterations and adjustments are manual, so the outcome is dependent on the expertise of the engineer. An algorithmic approach provides better results without direct human intervention. In some conventional approaches, the iteration time for each cycle is a few weeks as the results of the iterations are evaluated by post-build cut-ups and material characterization. By contrast, using the algorithms described herein, results can be evaluated from the sensor data immediately after the build. Because the parameters are adjusted algorithmically, rather than through trial and error, fewer iterations are needed to converge. Conventional manual parameter optimizations take a material debit because they cannot segment a part with fine enough resolution to have different scan parameters along a strike.

Lower new product introduction (NPI) cycle time results in saved cost on complex parts and also greater throughput (i.e., more parts optimized during same time). The techniques described herein also have the potential to expand the design space by enabling geometries not possible otherwise. Combining sensor data with model data and updating the model using a tracking filter achieves higher fidelity results relative to conventional approaches.

In disclosed embodiments, the output of the quality score generator may be attached to an entire part, sections of a part, an entire build, or sections of a build. The output of the quality score generator may be attached to portions of a part based on complexity or geometry, e.g., attached for contours, thin walls and overhangs, but not bulk regions. The output of the quality score generator may be binary, e.g., pass/fail, or may have multiple levels, e.g., high, medium, and low, in which case parts with a high quality score could be deemed premium parts, parts with a medium quality score could be deemed acceptable parts (i.e., parts for use in less critical applications), and parts with a low quality could be rejected. The output of the quality score generator may be a set of values indicative of particular types of post-processing required for the part, such as, for example, post-process A, post-process B, and reject. For example, some parts may need light hot isostatic pressing (HIP) processing, others may need intense HIP, others may have useful sections cut out, and others may be rejected.

In disclosed embodiments, in-situ generation of quality score can be used to make go/no-go decisions while a build is in progress. For example, a low score could result in discontinuation of the part, a medium score could result in altering input parameters to improve part quality, and a high-score could result in continuing the build with the original parameters. Post-build analysis and generation of quality score may enable informed decisions on the method chosen for a part for post-build analysis (e.g., metallography and physical testing) with desired fidelity for parameter development. For example, within medium to high quality score parts, a higher quality score may indicate that no analysis required, whereas a lower quality score may indicate the need for inexpensive "destructive" optical micrographs from cut-ups or expensive "non-destructive" computed tomography for higher fidelity assessment of quality.

In disclosed embodiments, the photodiode response associated with anomalies and microstructure variations in as-built condition, resulting from process variables may be considered, including correlation between quality score and microstructure of the post-processed parts, e.g., parts subjected to heat treatment and/or HIP. Materials microstructure and chemistry, of an additively built part or a representative area/section of a part, may be measured/mapped by direct (e.g., optical, SEM imaging) or indirect methods (e.g., diffraction, spectroscopy), where output could be a single value or set of single values for each measurement type (e.g., mean, median, standard deviation, etc.) or full-field spatially distributed map of the measured area. Methods for mapping/measuring microstructure and elemental chemistry distribution of as-built and post-processed additively-built parts may include, for example, optical imaging, scanning electron imaging, back-scattered electron imaging, electron-back scattered diffraction, energy or wave-length dispersive spectroscopy, atomic force microscopy, x-ray diffraction, transmission electron microscopy (both imaging and diffraction), and so on.

In disclosed embodiments, quality scores may be determined for different anomalies, such as, for example, pore density, crack density, and lack-of-fusion defect density. A single overall score may be derived from a combination of multiple sub-scores, e.g., sum, weighted sum, maximum, average, weighted average. Response maps, formed from a plurality of surface images, may be generated in which quality score is mapped to input process parameters (e.g., laser power, scan speed, beam spot-size/focus offset, and hatch spacing). Response maps may be generated in which as-built anomalies (e.g., pores, cracks, lack-of-fusion defects) and microstructure measured parameters (e.g., grain size and gamma/gamma prime size distribution) are mapped as a function of input parameters (e.g., laser power, scan speed, beam spot size/focus offset, hatch spacing), derived values (e.g., linear heat input, energy density, and beam intensity), process variables (e.g., melt-pool width and depth), and a generated quality score.

In one aspect, the disclosed embodiments provide a method (and corresponding system and software) for determining a quality score for a part manufactured by an additive manufacturing machine based on sensor data without physical testing of the part. The method includes receiving, via a communication interface of a device comprising a processor, sensor data from the additive manufacturing machine during manufacture of the part using a first set of build parameters. The method further includes applying a first algorithm to at least the received sensor data to generate a quality score. The first algorithm is trained by receiving a reference derived from physical measurements performed on at least one reference part built using a reference set of build parameters. The method further includes outputting the quality score via the communication interface of the device.

Embodiments may include one or more of the following features.

The method may further include receiving the first set of build parameters, in which case the first algorithm is applied to the received sensor data and the first set of build parameters to generate a quality score. The reference may relate a quantity (e.g., a density) of at least one anomaly type to the reference set of build parameters. The reference may relate a quantity (e.g., a density) of the at least one anomaly type to a reference set of sensor data measured during manufacture of the reference part using the reference set of build parameters. The reference may include coordinates for plotting the quantity of the at least one anomaly type relative to the reference set of sensor data. The reference may include coefficients of a function relating the quantity of the at least one anomaly type to the reference set of sensor data. The method may further include generating, using the processor of the device, thermal data based on a thermal model of the part derived from the first set of build parameters. The method may further include determining, using the processor of the device, a second set of build parameters using a second algorithm applied to the received sensor data, the determined quality score, and the thermal data, the second algorithm being trained to improve the quality score; and outputting, via the communication interface of the device, the second set of build parameters to the additive manufacturing machine to produce a second part. The sensor data may be received from at least one of an actuator sensor, a melt pool sensor, and an environmental sensor.

DETAILED DESCRIPTION

In disclosed embodiments, a "quality score" is defined and used to point out what kinds of anomalies have happened (or will happen) in a built part in a probabilistic sense. For example, for a particular process, a determined melt pool temperature and dimensions may be needed for acceptable part quality. Other techniques consider input process parameters of interest, such as laser power and speed, and try to detect shifts in those input parameters. However, such techniques do not provide an indication of whether the determined deviation will lead to anomalies, e.g., lack of fusion, porosity, and cracks, in the built parts and the likelihood of such anomalies. The quality score analysis, on the other hand, takes input data and, based on a mapping to the quality score, predicts anomalies in the built parts and their likelihood.

Figure 1:
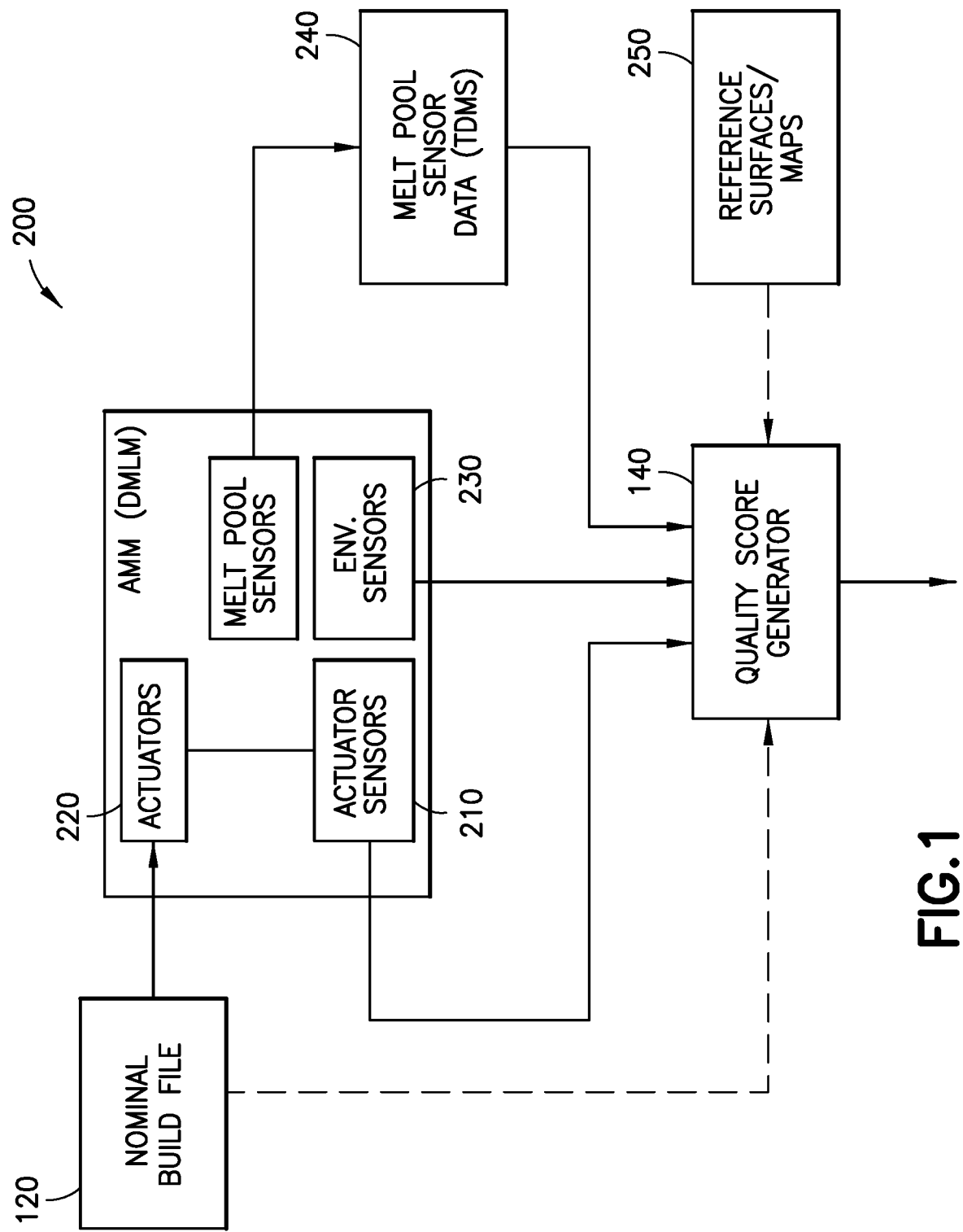
FIG. 1 is a diagram of a system for determining a quality score for the produced part using a quality score generator which receives sensor data from the additive manufacturing machine.

FIG. 1 is a diagram of a system 200 for determining a quality score for a produced part using a quality score generator 140 which receives sensor data from an additive manufacturing machine 110. The sensor data may include data from actuator sensors 210 associated with actuators 220 in the AMM 110, such as galvanometer position sensors. The sensor data may also include data from environmental sensors 230, such as, for example, atmospheric pressure, oxygen level, airflow, smoke, etc. The sensor data may also include data from sensors 240 monitoring characteristics of the melt pool, such as, for example, photodiode, pyrometer, acoustic emission, etc. Also, as explained in further detail below, the quality score generator 140 receives training data, e.g., response surfaces/maps 250 derived from experimental testing of built parts.

As the additive manufacturing machine 110 (e.g., a DMLM machine) performs a build, the machine produces output data from melt pool sensors 240, e.g., in the form of data files in technical data management streaming (TDMS) format. Data is also produced by other sensors of the machine, such as, for example, actuator sensors 210 measuring galvanometer position, which positions the laser spot, and various environmental sensors. Other sources of data include commands to additive machines, materials property data, and response surfaces/maps 250. The built-part properties are determined based on these various process parameters. As discussed above, the data from the DMLM machines can be used as inputs to a quality score generator which outputs a quality score. Such a quality score could be, in a simple case, a "go/no-go" score. In disclosed embodiments, a numeric score is used to indicate the quality of a built part. In disclosed embodiments, the quality score is used after the part is built (or during the build) to assess whether the part is of acceptable quality. This is done in lieu of, or in conjunction with, other more time-consuming evaluation processes, such as cut up and analysis of the parts.

Conventionally, such evaluative outputs are obtained by performing destructive analysis of parts, e.g., cut ups. Once a parameter set is obtained, a build is performed with the parameter set, the sample (i.e., part) is taken out of the machine, and a cut up of the part is performed. A defect score may be obtained from automated analysis under a microscope. When this process is done for a specific set of input parameters, a response map can be generated. Based on the scores determined from the analysis of the cut-up layers, there may be combinations of input parameters which yield good results, combinations which yield bad results, and gray areas in between. These combinations of input parameters may be depicted visually in the response map as the axes of a 2D or 3D plot, while the output (e.g., density of anomalies or quality score) may be represented by color-coded, e.g., red, blue, and green regions.

In disclosed embodiments, the response map (e.g., a "response surface") may be, for example, a direct illustration of experimental data on a 2D, 3D, or 3D with color coding plot, or a mathematical function derived via experiments where there are inputs given by: (i) a set of parameters, such as, laser power, focus offset or beam spot-size, scanning speed, hatch spacing, and layer thickness, and/or (ii) measured or derived process variables, such as melt-pool depth, melt-pool width, melt-pool temperature, and/or thermal gradient. The output obtained from the response map may be, for example, a color-coded plot of quantity, e.g., density, of anomalies or defects, such as, area or volume percentage of pores, cracks, and lack-of-fusion defects. It should be noted that the term "response surface" is being used to describe a mathematical relationship between various process inputs, such as those mentioned above, and the density of anomalies, as opposed to something relating to the physical surface of a part being built.

Disclosed embodiments provide for recording sufficient sensor data to extend the input space so that the sensor data, in conjunction with input parameter set, e.g., a build file, provides enough information to allow prediction of a defect score (e.g., quality score) without performing cut ups (i.e., dissecting) and/or doing other direct part testing, such as optical coherence tomography (OCT) imaging. In disclosed embodiments, experiments, e.g., physical testing, is performed to generate a response surface and these results are then generalized, e.g., by creating a model, to apply to any built part.

In disclosed embodiments, an association is created between all input variables and some form of quantified notion of quality score, which may be discrete or continuous (e.g., low/medium/high or a real number). An initial version of model (e.g., a regression model) may be used to build a direct association from input variables to the output quality score. Such a model may use an equation expressed in terms of the input variables with coefficients, i.e., a regression model. The relationship between the input variables and the output may be highly non-linear and complex, as there are potentially a large number of inputs (e.g., the intensity of each pixel of a 256×256 pixel image) and potentially only one output, i.e., the quality score. Transformations of the input variables may be created, i.e., explicitly transforming the input variables into "feature space," or neural networks, decision trees, etc., may be used, i.e., machine learning. This provides a space where the problem of mapping is made easier. In other words, one may start with direct variables and construct latent variable spaces to simplify the problem. Machine learning, in particular, can be used to take high-dimension, multiple-variable space and map it to an output where the underlying relationship is known to be complex, non-linear, and non-trivial.

Figure 2:
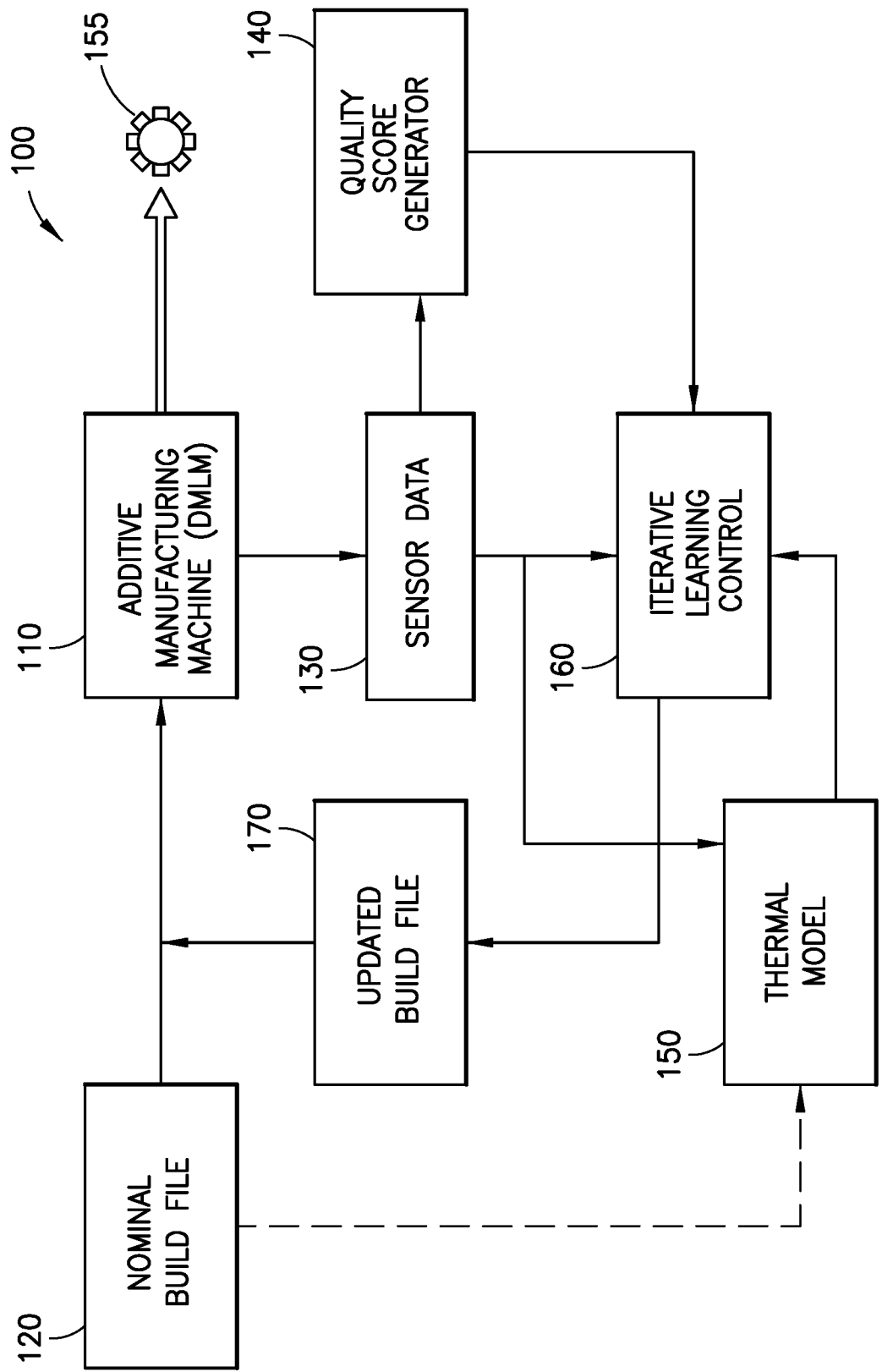
FIG. 2 is a block diagram of a system for correcting build parameters for producing a part, in an additive manufacturing process, using a quality score for the part derived from build parameters and sensor data.

FIG. 2 is a block diagram of a system 100 for correcting build parameters for producing a part, in an additive manufacturing process, using a quality score for the part derived from build parameters and sensor data, as described above. A set of nominal build parameters is input to an additive manufacturing machine (AMM) 110, such as, for example, a direct metal laser melting (DMLM) printer (i.e., machine). The nominal build file 120 may be in the form of a common layer interface (CLI) file, which may include a set of scan parameters, i.e., build parameters. As the DMLM printer 110 performs the build, based on the nominal build file 120, sensor data 130 is collected from various sensors associated with the printer. The sensor data 130 is input to a quality score generator 140, which calculates a score indicative of the quality of the built part without physical testing of the part.

The nominal build file 120 is also input to a thermal model 150, which models the thermal response of the built part to the applied laser power. As described in further detail below, the thermal model 150 uses the nominal build file 120 and sensor data 130 received from the DMLM printer 110 to predict the heat density within the volume of the built part 155 which would result from applying a particular level heat input from the laser during a scan. The thermal model 150, in effect, creates a correlation between heat input parameters specified in the build file (e.g., laser power and scan speed) at each position in the scan path, with an expected sensor reading for that position, e.g., a photodiode reading, during the build.

The sensor data 130, the quality score calculated by the quality score generator 140, and the output of the thermal model are input to an iterative learning control (ILC) 160. As described in further detail below, the ILC 160 uses machine learning algorithms to produce an updated build file 170 based on these inputs. The ILC 160 thus creates a mapping between the scan parameters of a build file and the resulting quality score of a part produced using the build file, which allows a build file to be optimized using an iterative machine learning process. This process results in a built part having higher quality without performing multiple rounds of experimental testing, as in conventional approaches.

Iterative learning control 160 is a term which covers various learning and control algorithms which are configured to learn from previous builds and improve the quality of subsequent builds. Disclosed embodiments provide for application of the quality score, in control applications which require a reference to track, through use of iterative learning processes. The generation and use of a quality score, as discussed herein, allows for an array of physical characteristics to be modeled, such as, for example, porosity, surface finish, etc., which are conventionally determined using cut ups. In disclosed embodiments, sensor data and other input data can be examined to determine physical properties of a built part, e.g., porosity and surface finish, and these sensor spaces can be used in a model to achieve parts of desired quality.

In disclosed embodiments, given various inputs, e.g., sensor inputs and process parameters, a model can predict quality score which, in turn, can be used to determine whether the built part will be acceptable. If predicted part quality is not acceptable, then various actions can be taken to improve the manufacturing processes. In other words, given the model, given the response map with sensors, given the build data and the scan file (e.g., CLI build file), the quality score generator can be used to predict whether a build was acceptable or not. If the quality score indicates that the build will not be acceptable then the ILC tries to understand what is not acceptable (e.g., via machine learning algorithms) and make corrections to the scan file of the part being built to make future builds more acceptable.

In general, there may be a number of different disturbances acting on the fabrication process. If there were no disturbances, one could design an ideal scan parameter set, e.g., laser power, speed, etc., and one would expect that every time this parameter set (i.e., "recipe") were executed, the result would be a part having the desired characteristics. However, this does not happen because there disturbances acting on the system throughout to dislodge the process from its nominal values. Some of these can be predictable disturbances, e.g., if one is trying to build the same geometry, then the thermal conductivity is a disturbance that would be same for every instance, i.e., every build. Similarly, if the same machine is being used and there is a problem in the optic train, then the problem is known and one can calibrate for that. On the other hand, there will be some disturbances which will be random and will therefore vary from build to build. Such disturbances cannot be compensated for in a predictable manner. Iterative learning control (ILC) is used to learn from historical builds and correct in subsequent builds, which may be considered to be a "feed forward" control process.

Figure 3:
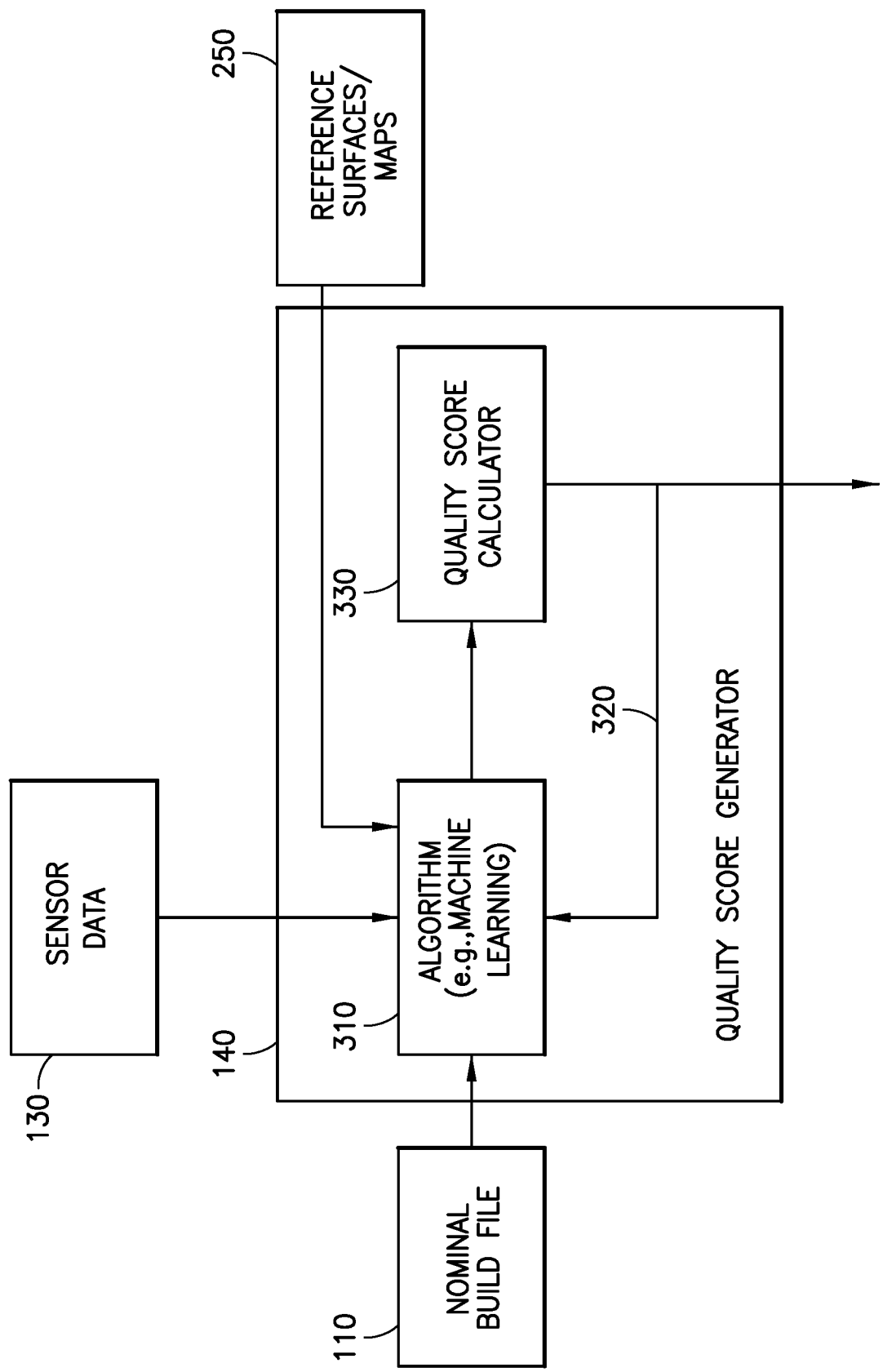
FIG. 3 is a diagram of the quality score generator.

FIG. 3 is a diagram of the quality score generator 140. As explained above, the quality score generator 140 receives sensor data 130 from the AMM, the nominal build file 120 for the part being produced, and reference data 250 derived from testing of built parts. The sensor data 130 and nominal build file 120 are input to a machine learning algorithm 310 which is trained to produce a quality score for a built part. The machine learning algorithm 310 is trained using a response surfaces/maps 250 which, as discussed above, is derived from physical testing of the part. Such testing may involve slicing a built part and analyzing each slice, e.g., using optical coherence tomography (OCT), to determine the presence and densities of the various types of anomalies. A quality score calculation 330 may be performed, such as, for example, the combining of quality scores for different types of anomalies, and the result is output by the quality score generator 140. Alternatively, the machine learning algorithm 310 may determine a quality score which is directly output by the quality score generator 140.

In disclosed embodiments, three types of anomalies may be considered: pores, cracks, and lack-of-fusion defects. An indication of the quantity, e.g., overall area or volume percentage and/or density, of such anomalies, e.g., a quality score, can be predicted for each of such characteristics or these quality scores could be combined to obtain a sum, maximum, weighted average, etc., depending on relative importance of these characteristics vis-à-vis desired physical and mechanical performance. For example, in some situations cracks might be the most important characteristic, whereas in other situations pore density and lack-of-fusion anomalies might be more significant.

To train the machine learning algorithm 310, cut ups of built parts may be performed to produce response surfaces/maps 250. In disclosed embodiments, images of the cut ups can be divided into smaller sub-regions, e.g., regions of 3×3 pixel space (k×k, in general, where k can be treated as a parameter), thereby turning the image into vectors, i.e., flattening the image. Numerical matrices may be generated which have a number of inputs, e.g., nine variables for each 3×3 pixel space, with one output variable. It is determined whether the examination after the cut up has revealed any anomalies in that 3×3 pixel space, which means that one is locally looking at the image and asking whether there is a lack-of-fusion or any porosity issues or other anomalies. Then a label is assigned to the 3×3 pixel region being examined. In other words, on a binary scale, does this 3×3 pixel region have an anomaly or not. This amounts to a binary classification problem, which is the typical data format by which machine learning models consume input, although the multi-class versions of this problem, whereby the different classes would be the different defect-types, can also be solved using machine learning methods for multi-class classification problems. In either case, a multi-variate latent variable model, i.e., machine learning model, can perform mapping between a nine-element (n-element vector, in general) vector to a single value. With such a model, one can create any 3×3 pixel (k×k, in general) combination of intensities and feed it to the model and it will indicate the likelihood of a defect (or defect-type) being present in the corresponding sub-region of the built part.

In alternative embodiments, instead of flattening measured part data into a matrix, the image can be consumed as a whole by the machine learning algorithm 310, which may be, e.g., a deep learning model, such as fully convolutional networks or "U-Nets." Such a model could be used to construct a predicted micrograph image directly from the sensor data. In alternative embodiments, rather than using a two-dimensional image, a set of three-dimensional slices may be used. In other words, instead of a 3×3 set of pixels, one could examine a 3×3×3 pixel cube. Furthermore, although metallic cross-sections have been described, it is also possible to produce three-dimensional reconstructed volume from 2D computed tomography (CT) slices and to correlate sensor data in 3D space and 3D CT images.

In disclosed embodiments, a statistical quality transfer function is developed to predict the density of specific anomalies in the built parts. Various types of anomalies may be considered, such as, for example, pores, lack-of-fusion defects, and cracks. The significant parameters for a part being built may include the mean value of photodiode signal and particular process parameters, e.g., the laser power setting and power divided by laser scan speed. A linear or nonlinear model may be used to provide a transfer function which, in disclosed embodiments, has a relatively high r-squared factor, e.g., of higher than about 0.8.

In disclosed embodiments, there may be at least two types of response surfaces/maps 250. A first type may be produced based on controlled experiments which seek to describe the properties of the material of the part based on input parameters, e.g., laser power, focus, and speed. In such a case, a part may be produced and subjected to analysis, such as cut ups and imaging. Algorithms, e.g., machine learning, may be used in connection with a relatively small number of iterations. The results of such experiments provide an indication of regions in a laser parameter space which will give parts a sufficiently low density of anomalies. This, in turn, may be used to set initial settings of the additive manufacturing machine (AMM).

A second type of response surfaces/maps 250 may include laser parameters such as those mentioned above in combination with sensor output data. For example, while the manufacturing process is being run, sensors such as photo diodes and cameras may be used to measure characteristics of the melt pool, e.g., size and temperature. The sensor data may, for example, show that laser parameters do not necessarily translate into stable melt pool characteristics. For example, the measured photodiode signal may not be constant, i.e., it may have variation and may not be a clean signal with respect to spatial locations of the part. Therefore, the characteristics of the sensor outputs, e.g., the photodiode output signal, may provide another way to predict the quality of a part. Thus, the information on material properties provided by the first type of response surface, which can be used to set the laser parameters, can be supplemented by sensor readings to provide a more accurate model of part quality.

In disclosed embodiments, the quality score generator 140 receives sensor data 130, and applies a multi-dimensional mathematical formula or algorithm, e.g., a machine learning algorithm 310, to produce a quality score, which may be a number or a set of numbers. The algorithm 310 may be trained by making several builds of part and performing physical testing, e.g., cut ups and/or volumetric CT, etc., to measure anomalies/defects. This may include building relatively simple reference parts and using varying sets of laser parameters to build the parts. Such experiments may be an adjunct to the experiments discussed above, which are used to produce response surfaces. The quality score generator may be adapted to use a formula that takes various types of anomalies, e.g., porosity, lack of fusion, cracking, and combines the corresponding individual quality scores to produce an overall quality score (e.g., by using a weighted average). The combined quality score could be adapted to give greater weight to particular types of anomalies. Thus, the quality score algorithm may be trained through experimentation, e.g., by a number of iterations of producing and physically analyzing parts.

Once the algorithm 310 is sufficiently trained, one can input measured sensor data 130 and a nominal build file 110 for a non-experimentation case and the algorithm 310 can output a response surface (e.g., a plot representing a multi-dimensional relationship between inputs, such as laser parameters and sensor data, and outputs, such as density of anomalies) just as if physical testing and analysis had been performed. The generated response surface can then be quantified in terms of a quality score. For example, the quality score may be obtained via a further calculation, such as an averaging of densities of anomalies. Alternatively, the algorithm 310 can directly output one or more quality scores, which can be used separately or mathematically combined. The determined quality scores may be fed back 320 to the algorithm 310.

Figure 4:
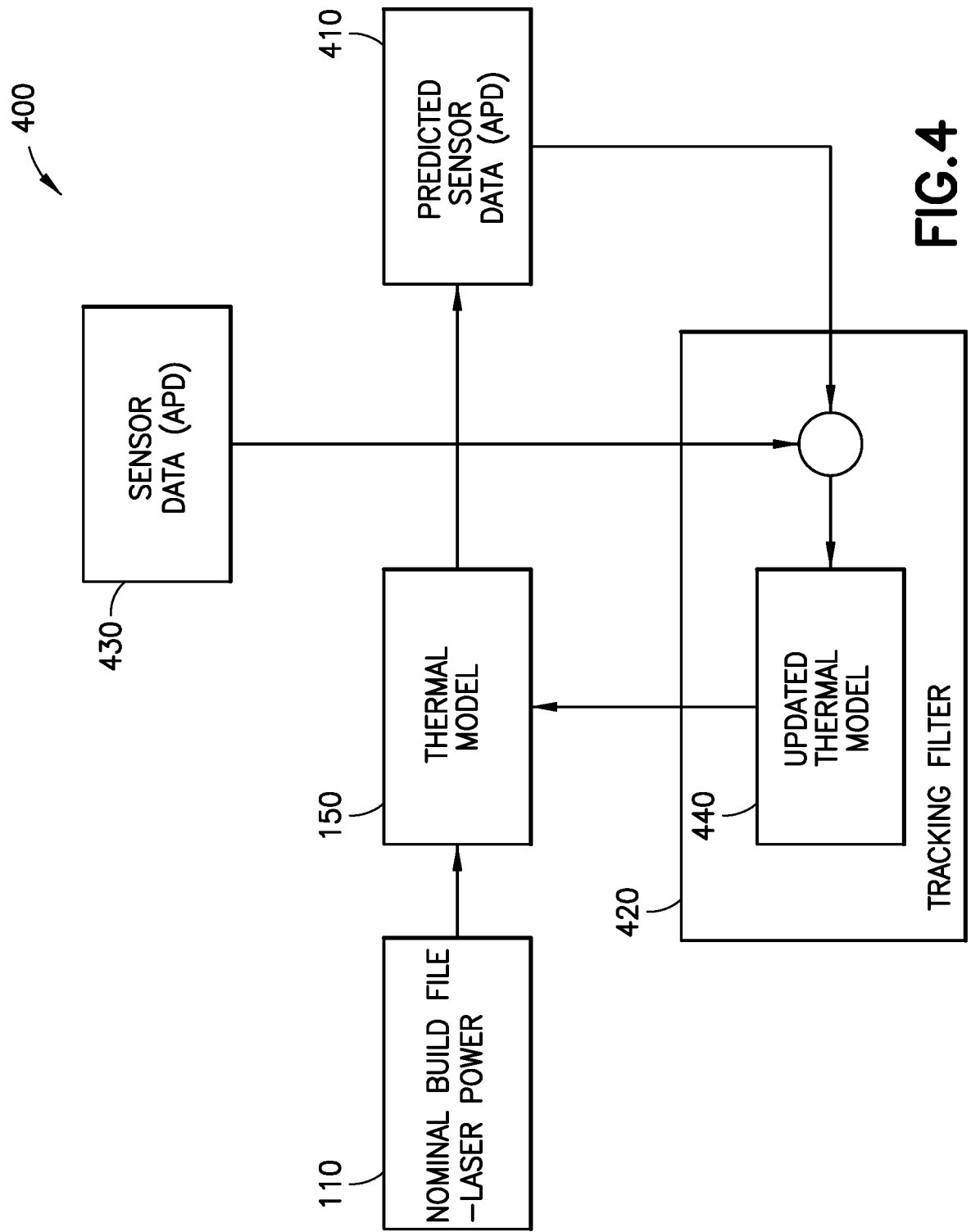
FIG. 4 depicts a system for updating a thermal model of the part produced in the additive manufacturing process.

FIG. 4 depicts a system 400 for updating a thermal model 150 of the part 155 produced in the additive manufacturing process. As noted above, the thermal model 150 uses the nominal build file 120 and sensor data 130 received from the AMM 110, e.g., the DMLM printer, to predict the heat input in the volume (i.e., energy density) of the built part 155 which would result from applying a particular level of laser power during a scan. The thermal model 150 converts the predicted energy density into corresponding predicted sensor readings, such as, for example, photodiode sensor data 410. A tracking filter 420 compares the predicted sensor readings 410 to actual measured sensor data 430 received from the AMM 110. The difference is used to generate an updated thermal model 440 which is output by the tracking filter 420 to replace the existing thermal model 150.

Figure 5A:
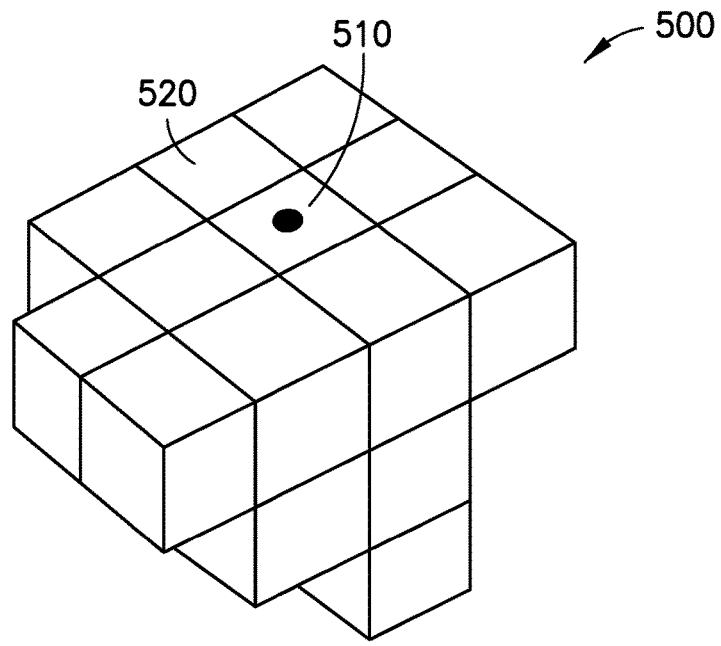
FIG. 5A depicts a portion of a part which is voxelized to produce a nominal thermal model.
Figures 5B, 5C:
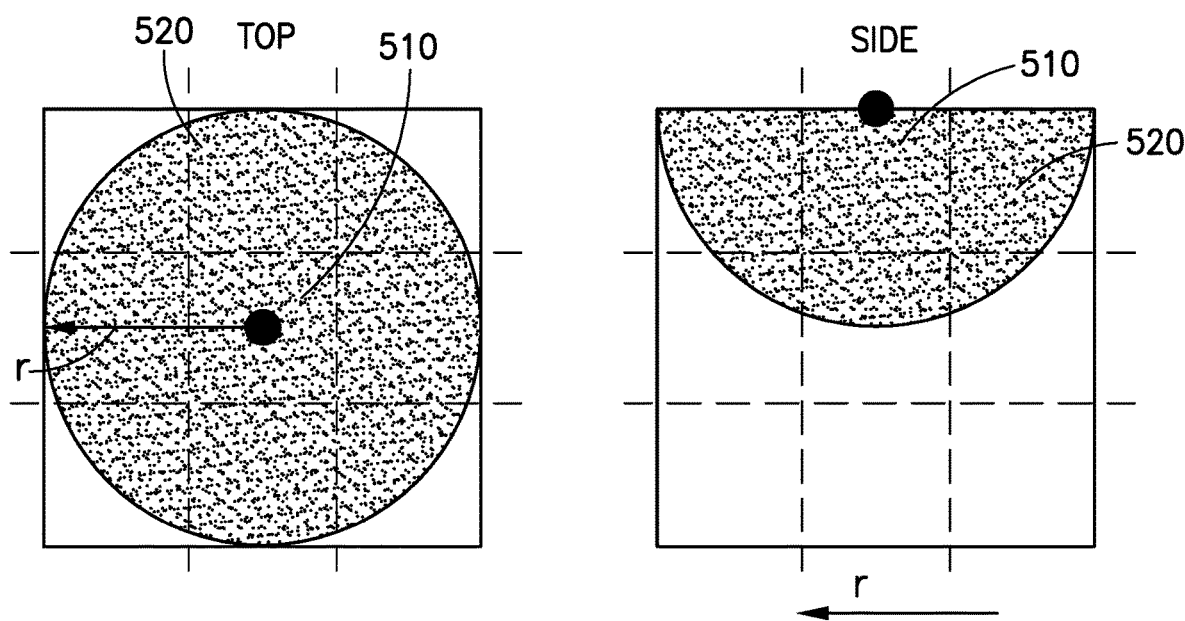
FIG. 5B depicts, in a top view, determining a relative amount of surrounding material within a defined radius of a center of a particular voxel.
FIG. 5C depicts, in a side view, determining a relative amount of surrounding material within a defined radius of a center of a particular voxel.

FIG. 5A depicts a portion of a part 500 which is voxelized to produce a nominal thermal model. For example, a part 500 may be divided into cubes of, for example approximately 0.3 to 1.0 mm in dimension. Other sizes are possible and may be selected based on the geometry of the part 500. As the laser scans each voxel during the build process, a portion of the heat generated in the voxel dissipates to neighboring voxels 520. As shown in FIG. 5B, for a particular voxel 510, the heat dissipation can be estimated by determining the number of adjacent voxels within a determined radius (r). If, for example, a voxel 510 (as viewed from the top) is surrounded on all sides with adjacent voxels 520, the voxel 510 can be expected to dissipate a relatively large portion of the heat resulting from the scan. On the other hand, as shown in FIG. 5C, if the voxel 510 (as viewed from the side), is positioned on top of the built part 500, then the radius of heat dissipation is only applicable to the neighboring voxels 520 at or below the top surface, which leaves an entire (i.e., upper) hemisphere which does not have neighboring voxels to provide heat dissipation.

In disclosed embodiments, a tracking loop is provided which starts with a nominal thermal model, i.e., a heat dissipation model for a part being built. In such a case, the input to the ILC includes a thermal model of the part and the scan file (e.g., CLI build file). Based on this, the ILC predicts what the sensor response is going to look like, e.g., what spots in the part are going to be hotter than allowable, colder than allowable, etc., based on thermal characteristics. For example, corners have less heat flow/conductivity will therefore become hotter than other portions of the part if the same amount of energy is applied. In the middle region of the part, on the other hand, there is a lot of heat conductivity (i.e., more paths for heat to dissipate), so if the same amount of energy is applied, the regions in question will be colder because heat can flow away more easily.

If a perfect thermal model were available, then an iterative learning loop would not be needed. In such a case, one would have the model, and a reference, e.g., a response surface/map based on sensor data, so an ideal build file could be generated to achieve a specific defined quality outcome. In practice, an approximate model is available which is sufficient for control purposes, but which results in actual sensor data differing from predicted values. These differences (i.e., estimation error) can be fed back to update model through tracking filter. Therefore, for each build, the nominal thermal model is updated based on the estimation error. After a few iterations, the nominal thermal model with an updated parameter set will have very high fidelity which will help the ILC to converge faster.

Figure 6:
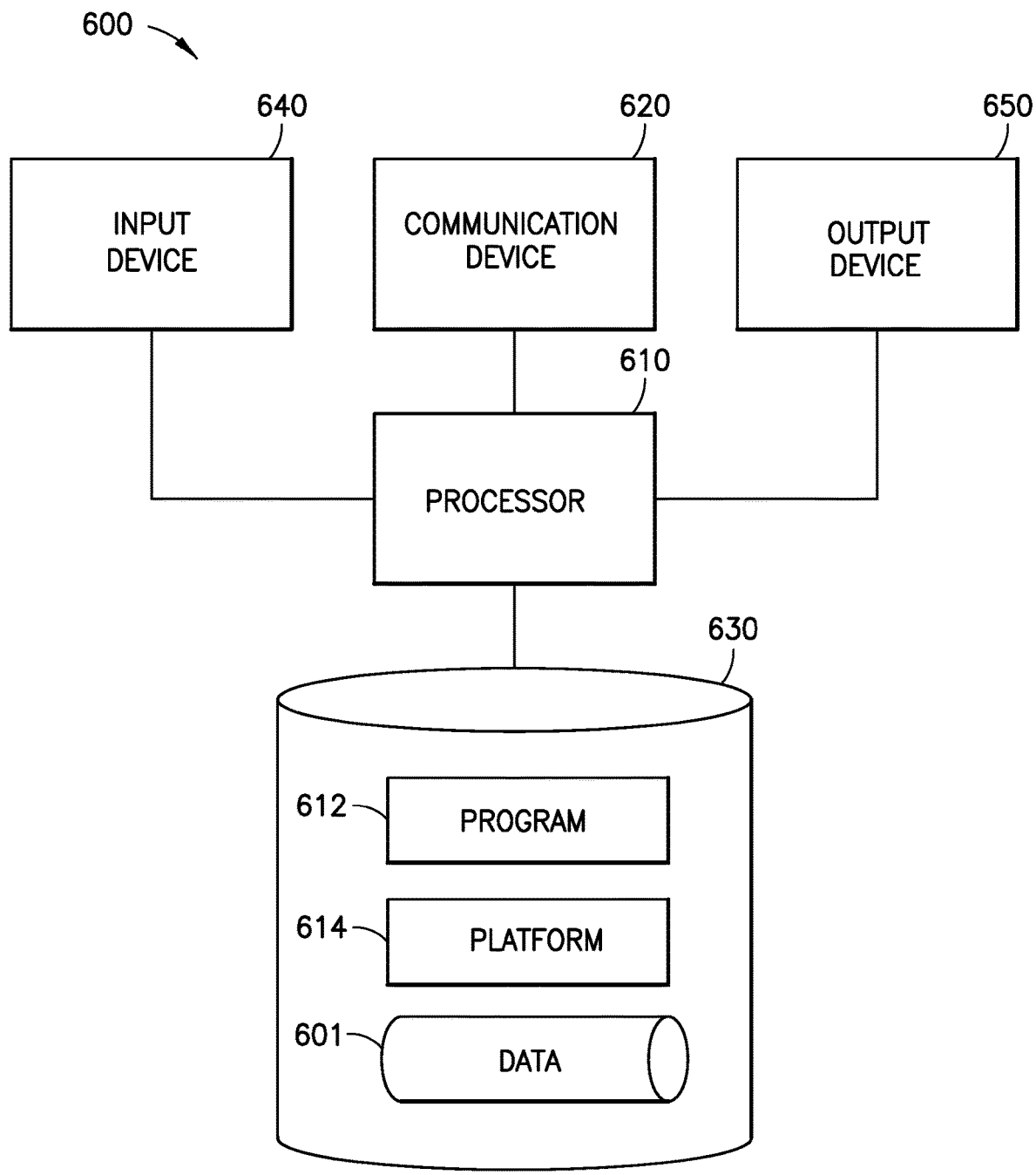
FIG. 6 is a block diagram of a system according to some embodiments.

FIG. 6 is a block diagram of apparatus 600 according to some embodiments. Apparatus 600 may comprise a general-purpose or special-purpose computing apparatus and may execute program code to perform any of the functions described herein. Apparatus 600 may comprise an implementation of one or more elements of system 100. Apparatus 600 may include additional elements which are not shown, according to some embodiments.

Apparatus 600 includes processor 610 operatively coupled to communication device 620, data storage device/memory 630, one or more input devices (not shown), and one or more output devices 630. The network interface 610 may facilitate communication with external devices, such as an application server. Input device(s) may be implemented in the apparatus 600 or in a client device connected via the network interface 620. The input device(s) may comprise, for example, a keyboard, a keypad, a mouse or other pointing device, a microphone, knob or a switch, an infra-red (IR) port, a docking station, and/or a touch screen. Input device(s) may be used, for example, to manipulate graphical user interfaces and to input information into apparatus 600. Output device(s) 630 may comprise, for example, a display (e.g., a display screen) a speaker, and/or a printer.

Data storage device/memory 640 may comprise any device, including combinations of magnetic storage devices (e.g., magnetic tape, hard disk drives and flash memory), optical storage devices, Read Only Memory (ROM) devices, Random Access Memory (RAM) etc.

The storage device 640 stores a program and/or platform logic for controlling the processor 610. The processor 610 performs instructions of the programs and thereby operates in accordance with any of the embodiments described herein, including but not limited to the processes.

The programs may be stored in a compressed, uncompiled and/or encrypted format. The programs may furthermore include other program elements, such as an operating system, a database management system, and/or device drivers used by the processor 610 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method, comprising:
  manufacturing a first part with an additive manufacturing machine using a first set of build parameters;
  measuring, by at least one sensor configured to measure parameters of a process of manufacturing a part with the additive manufacturing machine, sensor data during manufacture of the first part using a first set of build parameters;
  determining a quality score using a first algorithm applied to at least the received sensor data, wherein the first algorithm is trained by receiving a reference derived from physical measurements performed on at least one reference part built using a reference set of build parameters;
  determining a second set of build parameters using a second algorithm applied to the received sensor data and the determined quality score, the second algorithm being trained to determine a set of build parameters that improve the quality score; and
  manufacturing a second part with the additive manufacturing machine using the second set of build parameters.

2. The method of claim 1, further comprising:
  receiving the first set of build parameters,
  wherein the first algorithm is applied to the received sensor data and the first set of build parameters to generate the quality score.

3. The method of claim 2, wherein the reference relates a quantity of at least one anomaly type to the reference set of build parameters.

4. The method of claim 2, wherein the reference relates a quantity of the at least one anomaly type to a reference set of sensor data measured during manufacture of the reference part using the reference set of build parameters.

5. The method of claim 4, wherein the reference comprises coordinates for plotting the density of the at least one anomaly type relative to the reference set of sensor data.

6. The method of claim 4, wherein the reference comprises coefficients of a function relating the density of the at least one anomaly type to the reference set of sensor data.

7. The method of claim 2, further comprising:
  generating thermal data based on a thermal model of the first part derived from the first set of build parameters.

8. The method of claim 7, further comprising:
  determining a the second set of build parameters using the second algorithm applied to the received sensor data, the determined quality score, and the thermal data, the second algorithm being trained to improve the quality score.

9. The method of claim 1, wherein the at least one sensor includes of an actuator sensor, a melt pool sensor, and an environmental sensor.

10. A system, comprising:
  an additive manufacturing machine configured to manufacture a part using a set of build parameters;
  at least one sensor configured to generate sensor data measuring parameters of a process of manufacturing a part by the additive manufacturing machine;
  a device comprising a communication interface and a processor configured to perform operations including:
  receiving, via the communication interface of the device, sensor data from the at least one sensor during manufacture of a first part by the additive manufacturing machine using a first set of build parameters;
  determining a quality score using a first algorithm applied to at least the received sensor data, wherein the first algorithm is trained by receiving a reference derived from physical measurements performed on at least one reference part built using a reference set of build parameters;
  determining a second set of build parameters using a second algorithm applied to the received sensor data and the determined quality score, the second algorithm being trained to determine a set of build parameters that improve the quality score; and
  outputting the second set of build parameters to the additive manufacturing machine.

11. The system of claim 10, wherein the processor is further configured to perform:
  receiving the first set of build parameters,
  wherein the first algorithm is applied to the received sensor data and the first set of build parameters to generate the quality score.

12. The system of claim 11, wherein the reference relates a quantity of at least one anomaly type to the reference set of build parameters.

13. The system of claim 11, wherein the reference relates a quantity of at least one anomaly type to a reference set of sensor data measured during manufacture of the reference part using the reference set of build parameters.

14. The system of claim 11, wherein the processor is further configured to perform:
  generating thermal data based on a thermal model of the part derived from the first set of build parameters.

15. The system of claim 14, further comprising:
  Determining the second set of build parameters using the second algorithm applied to the received sensor data, the determined quality score, and the thermal data, the second algorithm being trained to improve the quality score.

16. A non-transitory computer-readable medium storing program instructions that when executed, in a device comprising a communication interface and a processor, cause the processor to perform a method comprising:
  receiving sensor data from an additive manufacturing machine during manufacture of a first part using a first set of build parameters;
  determining a quality score using a first algorithm applied to at least the received sensor data, wherein the first algorithm is trained by receiving a reference derived from physical measurements performed on at least one reference part built using a reference set of build parameters;
  determining a second set of build parameters using a second algorithm applied to the received sensor data and the determined quality score, the second algorithm being trained to determine a set of build parameters that improve the quality score; and
  outputting the second set of build parameters to the additive manufacturing machine.

17. The computer readable medium of claim 16, wherein the performed method further comprises:
  receiving the first set of build parameters,
    wherein the first algorithm is applied to the received sensor data and the first set of build parameters to generate the quality score.

18. The computer readable medium of claim 17, wherein the reference relates a quantity of at least one anomaly type to the reference set of build parameters.

19. The computer readable medium of claim 17, wherein the reference relates a quantity of the at least one anomaly type to a reference set of sensor data measured during manufacture of the reference part using the reference set of build parameters.

20. The computer readable medium of claim 17, wherein the performed method further comprises:
  generating thermal data based on a thermal model of the first part derived from the first set of build parameters.

* * * * *